(12) United States Patent
Blier et al.

(10) Patent No.: US 10,001,239 B2
(45) Date of Patent: Jun. 19, 2018

(54) SYSTEM TO REPAIR DEFORMATIONS IN ELASTOMERIC HOSES

(71) Applicants: Darren J Blier, Westerly, RI (US);
Louis E Sansone, Sterling, CT (US);
Michael A Vartanian, Lincoln, RI (US)

(72) Inventors: Darren J Blier, Westerly, RI (US);
Louis E Sansone, Sterling, CT (US);
Michael A Vartanian, Lincoln, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 5 days.

(21) Appl. No.: 15/398,985

(22) Filed: Jan. 5, 2017

(65) Prior Publication Data

US 2017/0114940 A1    Apr. 27, 2017

Related U.S. Application Data

(62) Division of application No. 13/946,444, filed on Jul. 19, 2013, now Pat. No. 9,616,624.

(51) Int. Cl.
*F16L 55/18* (2006.01)
*F16L 11/00* (2006.01)

(52) U.S. Cl.
CPC .............. *F16L 55/18* (2013.01); *F16L 11/00* (2013.01)

(58) Field of Classification Search
CPC ............ B29C 73/00; F16L 55/18; F16L 11/00
See application file for complete search history.

(56) References Cited

U.S. PATENT DOCUMENTS 9,616,624 B1 *   4/2017   Blier ...................... B29C 73/00

* cited by examiner

*Primary Examiner* — Robert J Grun
(74) *Attorney, Agent, or Firm* — James M. Kasischke; Michael P. Stanley

(57) ABSTRACT

A system to repair a hose made from deformable material includes an elongated container for holding a liquid heated sufficiently for softening the hose. A heater can be positioned in the container. A plurality of restraining members can be positioned to retain the hose immersed in the liquid within the container. A gas supply is used to pressurize the hose prior to immersion, and a support is provided for holding the hose before and after immersion. A method includes filling an elongated container with a heated liquid and pressurizing the hose with a gas. The pressurized hose is immersed in the liquid and maintained immersed by retaining members to soften the hose. The hose is removed from the liquid, depressurized and allowed to cool.

10 Claims, 3 Drawing Sheets

SYSTEM TO REPAIR DEFORMATIONS IN ELASTOMERIC HOSES

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

This application claims priority to U.S. patent application Ser. No. 13/946,444, filed on Jul. 19, 2013, and entitled "Method to Repair Deformations in Elastomeric Hoses".

BACKGROUND OF THE INVENTION (1) Field of the Invention

The present invention relates generally to elastomeric hose assemblies and more specifically to a system and method for removing kinks from hoses and hose assemblies.

(2) Description of the Prior Art

Elastomeric hoses made from deformable materials such as plastic, rubber and the like are used in many applications, including industrial, military, and commercial applications. They can be subjected to pressurized conditions and handle many types of liquids and gases. These hoses are desirable because of their strength and flexibility. Both raw elastomeric hose and completed elastomeric hose assemblies are often damaged due to prolonged periods on a storage reel or the like while not in use. The hose and hose assembly damage generally consists of randomly spaced dimples or kinks formed in the hose. These deformations are formed as the hose conforms to the shape of the storage reel during extended storage. This can cause internal obstructions and impede the ability of the hose to transport liquid and gas as intended. Repairing and/or replacing these hoses can prove to be costly, time consuming, and labor intensive.

One previously known method to remove these deformations involves wrapping insulation around the damaged hose and running hot water through the hose. A second method involves wrapping an electrical heater tape around the hose to increase the temperature to the softening point. The primary disadvantage with these methods is the labor associated with wrapping and unwrapping thousands of feet of hose.

Another known method involves the use of a calibrated hot air gun to warm up and soften small areas of the hose. However, the temperature is difficult to control and often passes the softening point, causing dramatic weakening of the hose wall such that the hose blisters non-uniformly at test pressure. This method is cost-prohibitive because of the limited coverage area of the air gun in treating the hose.

The following patents discuss different background art related to the subject matter discussed above:

U.S. Pat. No. 3,175,246, issued Mar. 30, 1965 to Adolph Loges, describes an apparatus for heat treating long lengths of hose. This apparatus creates hoses with a reinforced structure by subjecting the hose to a thermal treatment in an apparatus comprising several sections of heating tubes joined together which tightly enclose the hose. Air or liquid is pumped through the hose, expanding the hose diameter to that of the external pipe.

U.S. Pat. No. 3,561,750, issued Feb. 9, 1971 to Woodrum, discloses a hose straightening fixture for holding curved rubber hose in a substantially straight condition comprising two arcuate members which are movable toward and away from one another with one of the members having surface interrupting knobs which press against the hose outside curvature to reduce the distance to the same as the inside curvature.

U.S. Pat. No. 4,306,857, issued Dec. 22, 1981 to Hofstetter, discloses an apparatus for heating a continuing series of articles, such as canned or bottled potable goods, to substantially room temperature in order to prevent condensation from forming on the containers. The apparatus comprises an elongated housing having an interior housing chamber and open on each longitudinal end. An endless conveyor transports the articles from one open end of the housing to the other end of the housing along a substantially horizontal plane. An elongated trough is disposed under the conveyor and is partially filled with heating water so that the articles are partially immersed in the water as they are transported through the housing. A recirculation system is also provided for continuously reheating the heating water.

U.S. Pat. No. 4,506,526, issued Mar. 26, 1985 to Kutz, et al., discloses an apparatus for treating webs of material with several buoyant rolls which engage the web of material, consist of a closed buoyant body and are arranged in a trough which contains liquid, is open at the top and is at atmospheric pressure, parallel and adjacent to each other horizontally restrained but freely floating in the vertical direction without touching each other. The rolls may be arranged horizontally side by side without forming roll gaps or vertically on top of each other, forming roll gaps with two guide rolls provided above each buoyant roll.

The above background art shows that a continuing need has long existed for a cost effective system and method to repair elastomeric hoses. Accordingly, those of skill in the art will appreciate the present invention which addresses the above discussed problems and other issues.

SUMMARY OF THE INVENTION

Accordingly, it is an object of the present invention to provide an improved system and method for repairing elastomeric hoses.

Another object of the present invention is to provide a cost-effective system and method for removing deformations from elastomeric hoses that does not require complex equipment or intensive labor.

Another object of the invention is to provide a system and method for repairing elastomeric hoses that can be readily applied to hoses of various lengths and circumferences.

In accordance with the disclosure, the present invention provides a system to repair a hose made from deformable material such as elastomeric material. This system includes an elongated container, such as trough, for holding a liquid heated sufficiently for softening the elastomeric material. A heater is operable for heating the liquid to a predetermined temperature or temperature range. A plurality of spaced apart restraining members are used to immerse the hose in the heated liquid. The plurality of restraining members each have an engagement surface that conforms to the hose for retaining the hose without damaging it. The restraining members are configured to immerse at least a portion of the hose within the elongated container when the hose is pressurized. A gas supply or compressor is used to pressurize the hose. A support is provided, such as carts or the like, for holding the hose before and after immersion of the hose in the elongated container.

In one embodiment, the system may further include a cover for the container. The cover acts to maintain condensation and heat in the container. The elongated container or cover can have notches or gaps formed therein that provide an entrance to and an exit from the container for the hose. In one embodiment, the cover is operable to support restraining members to immerse the hose in the liquid.

In another embodiment, at least one of a hinge or a clamp is disposed between the cover and the container, whereby the cover is closed with respect to the container by the hinge or the clamp.

In one embodiment, the plurality of restraining members have a density sufficiently higher than that of the liquid contained in the elongated container to provide a downward weight force that offsets the buoyant force of the pressurized hose in the heated fluid.

In one embodiment, the engagement surface comprises at least one semi-circular groove portion having an arc of slightly less than 180 degrees.

The present invention also provides for a method for repairing a hose made from elastomeric material, which includes steps such as providing an elongated container filled with a heated immersion liquid. Other steps may include unraveling a hose from a stored position, filling the hose with compressed gas and immersing the hose in the heated liquid. This can be performed on portions of the hose.

Other steps can include immersing at least a first portion of the hose into the elongated container using a plurality of restraining members. The hose can be removed from the container after a specified time duration sufficient for softening deformations. The hose can be allowed to cool in a relatively straight position before allowing the compressed gas to escape from the hose.

The method may further comprise steps such as subjecting the hose to a pressure test for 5-10 minutes to examine for the hose abnormalities. One abnormality exists if a diameter of the hose exceeds a predetermined threshold. This abnormality can be overcome by allowing the hose to rest for 12 hours and retesting the hose to insure that it is acceptable. If the hose fails the pressure test again then the hose is rejected.

The method may further include the step of providing a cover and covering the container wherein the cover acts to maintain condensation in the container. The cover can be operably attached by a hinge or a clamp between the cover and the container.

The method can further include steps, such as placing at least one rolling structure parallel to the container, transferring the hose on to the rolling structure before immersing the hose in the container.

The method can also include the step of providing a heater in the container for maintaining the temperature of the fluid for immersion.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate understanding.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
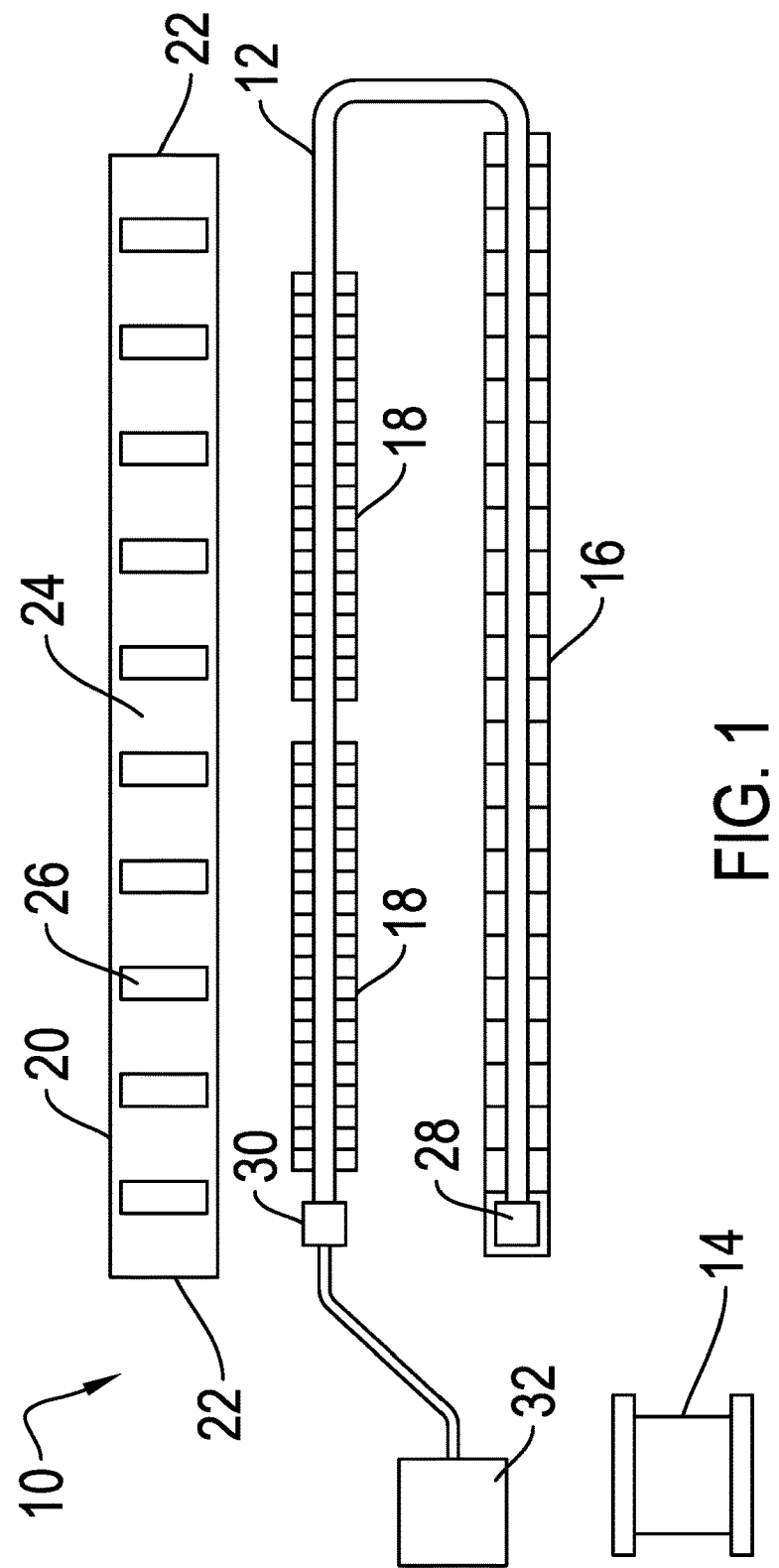
FIG. 1 is a plan view illustrating one possible system configuration in accord with one possible embodiment of the invention.

FIG. 1 illustrates a plan view of one possible hose repair system 10 configuration for removing deformations from an elastomeric hose 12 in accord with one possible embodiment of the invention. In this embodiment, hose 12 is unreeled from storage reel 14 and positioned on roller track 16 prior to treatment. Another portion of hose 12 can be positioned on roller carts, such as roller cart 18. One or more roller carts 18 can be used for this purpose. Roller carts 18 can be placed between a trough 20 and roller track 16 to aid in straightening hose 12 for inspection prior to heat treatment. Roller carts 18 and/or roller track 16 provide a working support that can be used for supporting hose 12. In a preferred embodiment, roller carts 18 are movable carts with rollers or sliding members or the like mounted on a top portion to facilitate moving hose 12 both into and out of trough 20 without damaging hose 12. Carts 18 can also be used to support a portion of hose 12 in a relatively straight position prior to heating or after heating.

Trough 20 is an elongated container having sufficient length to treat at least one segment of hose 12 at a time. Transition members 22 can be provided at ends of trough 20 to prevent damage to hose 12 where hose 12 enters and exits trough 20. Trough 20 is filled with a heated liquid 24. The current embodiment of trough 20 is fifty feet in length, although trough 20 could be longer or shorter. In this embodiment, trough 20 can be used to immerse thirty to fifty foot sections of hose 12 at a time, until the entire length of hose 12 is treated. Retaining members 26 can be provided in trough 20 to immerse and retain hose 12 in an immersed state.

In utilizing the embodiment, steps include filling trough 20 with a liquid 24 such as water or oil. Liquid 24, preferably water, is preheated to the higher range of treatment temperatures to allow for some cooling caused to the insertion of the hose 12 into the liquid. For example, as experimentally determined and based on a specific polyurethane hose material, the liquid may be preheated to a temperature between 145°-150° F. It has been found that this temperature range is suitable for softening deformable material in hose 12, which allows kinks and the like to be removed from the hose. This temperature is partially dependent on the Vicat softening point of the material, but because the hose can include other materials, this temperature range must be modified experimentally to optimize results. Depending on the hose 12 material, the liquid temperature should not drop below 142° F. during the hose treatment process. If liquid added to trough 20, it is preferably added in small increments to reduce the amount of time required to reach and sustain 142° F. and to avoid significant temperature changes. Of course the temperature range and preferred sustained temperature are based on the specific hose material and construction.

Fresh water comprises one possible preferred liquid 24 in trough 20 to avoid any chemical incompatibility issues. In some instances, it may be desirable to use a different fluid other than water or an additive to the water in trough 20 to avoid excessive evaporation of water. Automotive antifreeze/anti-boil, or its equivalent, could be included with or used for liquid 24 for this purpose during the heat treatment cycle. Cover 34 can also be utilized for reduce evaporation this purpose and as an additional benefit may be used to aid in immersing inflated hose 12 within liquid 24, as discussed hereinafter.

If hose 12 is a raw elastomeric hose then hose 12 can be fitted with closure 28 at one end and air fitting 30 at a second end prior to treatment. Talcum powder can be used to lubricate and insert air fitting 30 which can then be secured with two hose clamps (not shown) or other suitable means. Talcum powder can also be used to lubricate and insert closure 28 in the other end of hose 12. Closure 28 can also be secured with two hose clamps (not shown) or other suitable means.

After preparing hose 12 with necessary fittings, such as air fitting 30 and closure 28 and positioned on roller track 16, hose 12 should be filled with compressed gas by connecting a compressor 32 to air fitting 30. Compressor 32 can provide an increased gas pressure within hose sufficient to make hose 12 semi-rigid while hose 12 is immersed in trough 20. As an alternative, compressor 32 can be another means for providing pressurized gas such as a compressed gas tank. Gas can be air or some other gas that is also substantially inert with respect to hose 12 material. Movable carts 18 can be moved to provide that hose 12 is straight for this purpose, if desired. The inflation pressure is based on the composition and thickness of hose 12. For some underwater towed array hoses used in naval applications, 15 psi plus or minus 0.5 psi has been found to be sufficient. However, varying pressures for different hose applications are possible using the present method.

Next, an inspection of the diameter of hose 12 should be conducted. After filling hose 12 with air, the hose diameter should be measured at several different hose positions against a specified tolerance. Preferably these hose portions should not be those parts of hose 12 having an apparent deformation, such as kinking or dimpling. Diameter exceeding the tolerance indicates a defect which could include a thinned hose wall. Exceeding the tolerance indicates that the hose should not be subjected to heat treatment.

Hose 12 can be treated in segments having the same length as trough 20. A smaller segment of hose 12 than trough 20 can be treated as long as an unsealed end of hose 12 is preferably maintained above the water level of trough 20.

For insertion in trough 20, hose 12 can be looped in the shape of a "U" along roller track 16 and roller carts 18. A first section of hose 12 will be immersed in trough 20 beginning at transition member 22. Transition member 22 can include a rubber strip or other cushioning placed where hose 12 enters trough 20 to prevent cutting or otherwise damaging hose 12 during the treatment. Hose 12 should be positioned so the end will be sticking above trough 20 with the hose resting against transition member 22. If hose 12 is not terminated by closure 28, approximately 12 to 15 inches of hose 12 should be exposed to air to ensure that hose 12 does not get wet internally.

After hose 12 is in trough 20, retaining members 26 are positioned on top of hose 12. In a first embodiment, shown in FIG. 2, retaining member 26 is joined to the top of trough 20, a trough cover 34 or the like, to aid in immersing hose 12. In a second embodiment, shown in FIG. 3, a retaining member 26 is weighted to hold hose 12 under liquid 24. Other types of retaining members 26 can be used in order to practice this invention. Depending on the type of hose 12, retaining members 26 can be spaced out such as by placement two feet from both ends of trough 20 and every three feet along the length of trough 20 to adequately counteract the buoyancy of hose 12. The types of retaining members 26 discussed hereinafter can be mixed if desired. Hose 12 should be inspected and retaining members 26 repositioned if any section of hose 12 is floating above water in trough 20. Accordingly, at a minimum, the number, spacing, and retaining members 26 is configured to immerse all sections of hose 12 that are to be heat treated. If desired, the positions for the retaining members 26 can be marked to facilitate repeatable installation.

Figure 2:
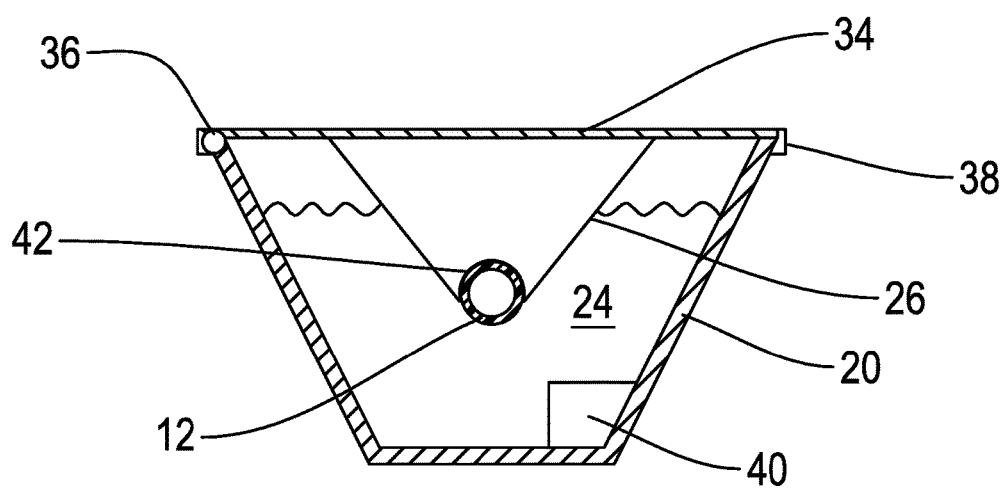
FIG. 2 is a sectional view depicting one possible trough arrangement.

FIG. 2 provides a sectional view of one embodiment of the trough 20 and retaining member 26. This embodiment utilizes a cover 34 joined to the top of trough 20. Cover 34 can be hinged to trough 20 as at 36. An opposite edge of cover 34 can be clamped to trough 20 as at 38. Cover 34 preferably conforms to trough 20 to help retain heat in trough 20 and prevent evaporation. Cover 34 can be secured in place to the top of trough 20 thereby providing force to retaining members 26 in position for submerging hose 12. Cover 34 can be insulated to minimize condensation in trough 20. Cover 34 can also be used as shown to aid retaining members 26 in resisting the buoyant force of the hose 12 when inflated and immersed. This embodiment also shows a heater 40 positioned within liquid 24 to heat and/or maintain liquid 24 at a preferred temperature. Heater 40 can be built into trough 20 or mounted externally.

When removing covers 34 to reposition or remove hose 12, the condensation is preferably allowed to drip back into trough 20 to reduce loss of liquid 24. A hinge 36 and a clamp 38 can be installed between trough 20 and cover 34, as depicted in FIG. 2. In this embodiment, six to eight inches of space can be left between covers 34 and transition members 22 to prevent impressions or damage to hose 12.

Retaining member 26 can be constructed to mount to or be held against an underside of cover 34 in order to apply a force to hold hose 12 in the immersed position against the buoyant gas-filled hose 12. Accordingly, cover 34 can be used to urge members 26 into the liquid with sufficient force to resist the buoyancy of the inflated hose. Retaining members 26 can also clamp to the top edge of trough 20 for this purpose.

In FIG. 2, retaining members 26 have a rounded cut out hose engagement surface 42 that conforms or roughly conforms to a portion of the outer surface of hose 12. Soft material, such as a cloth, resilient material or the like could be used on engagement surface 42, if desired. Preferably, surface 42 can be a circular arc of slightly less than 180 degrees. Having less than 180 degrees of arc allows hose 12 to be captured under retaining members 26 without an interference fit, which would increase the work required to remove members 26 from hose 12. Engagement surface 42 preferably has a diameter approximately equal to or slightly larger than the diameter of hose 12 for supporting or conforming to the round shape of hose 12. Additional shapes for engagement surface 42 can be provided within the scope of the invention, but a conforming engagement surface is presently preferred to limit or prevent damage to hose 12. Preferably, retaining members 26 capture hose 12 in a central portion of trough 20 where the temperature is relatively constant.

Figure 3:
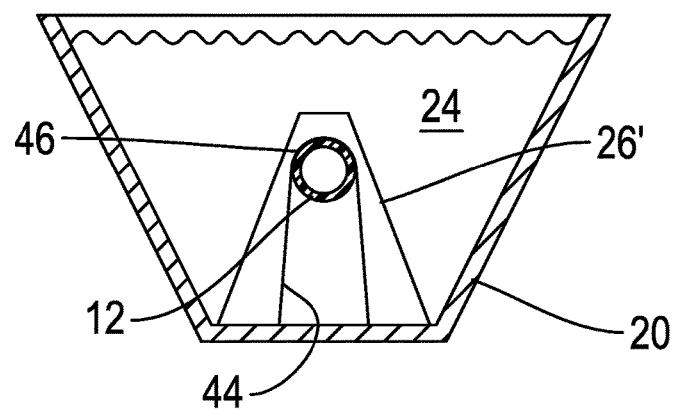
FIG. 3 is a sectional view showing another possible trough arrangement.

Referring now to FIG. 3, a second embodiment of retaining member 26' is designed to immerse gas-filled hose 12 independent of cover 34 or clamps. In this embodiment, retaining member 26' is sufficiently dense to allow retaining member 26' to counteract the buoyancy of the gas-filled hose 12, keeping hose 12 immersed in trough 20 during operation. Accordingly, in this embodiment, retaining member 26' can be shaped to rest on the bottom or lower portion of trough 20. Member 26' can be composed of many materials, provided that member 26' is heavier and/or denser than liquid 24 used in trough 20 and can apply a downward force greater than the buoyant force from gas-filled hose 12. Retaining member 26' has a slot 44 which is an elongated channel extending downward in member 26'. An engagement surface 46 is provided at the uppermost portion slot 44. In one embodiment, slot 44 has a width sufficiently larger than the inflated diameter of hose 12 to provide relatively easy placement of hose 12 within slot 44 while still limiting excessive movement. If desired, slot 44 can have sloped sides or the like to guide hose 12 upwardly against engagement surface 46 when inflated.

In this configuration, hose 12 remains in a central portion of trough 20 because slot 44 provides the room for hose 12 to ascend into engagement surface 46 while still allowing member 26' to apply enough force to keep hose 12 immersed in trough 20. Slot 44 terminates with upper engagement surface 46, which is preferably rounded to conformingly engage with hose 12.

In one embodiment, depending on the hose, each section of hose 12 is immersed in trough 20 for at least thirty minutes, allowing time for the deformable materials of hose 12 to heat up, soften, and ultimately decrease the size of any kinks or dimples present in hose 12. After heat treatment, the immersed portion is removed from trough 20 and placed on carts 18 and allowed to relax during cool down to room temperature while still pressurized with compressed gas. The portion of hose 12 already treated should be marked, preferably with masking tape or another tape not susceptible to water, and then led onto roller carts 18 to lay straight and flat during cool down. The next segment of hose 12 can then be fed into trough 20 to be treated as described hereinabove until the entire length of hose 12 has been treated.

After the final section of hose 12 cools for a predetermined period, thirty minutes in one embodiment, pressure in hose 12 should be reduced to ambient (0 psig). After additional cooling, two hours in this embodiment, hose 12 is subjected to another pressure test at 30 psig. Extreme care should be used when filling hose 12, and the process immediately stopped if hose 12 appears abnormally large. The entire length of hose 12 should then be re-examined for abnormalities including excessive diameter, bulges, and ballooning. Note that an hour glass shape near a termination in hose 12 is normal. Hose 12 should remain at this pressure for five to ten minutes and observations recorded in a data sheet After testing at thirty psig, pressure in hose 12 should be reduced to fifteen psig and the diameter of hose 12 measured, preferably using a tape every eighteen feet along the length of hose 12, as well as one foot from every coupling, if applicable. If the hose diameter is within the predetermined threshold then hose 12 passes the pressure test and is fit for operation. If the hose diameter exceeds the maximum threshold, then hose 12 should be depressurized and allowed to rest for approximately twelve hours. After this period, hose 12 is then retested, and if the hose fails again, then hose 12 is rejected.

Figure 4:
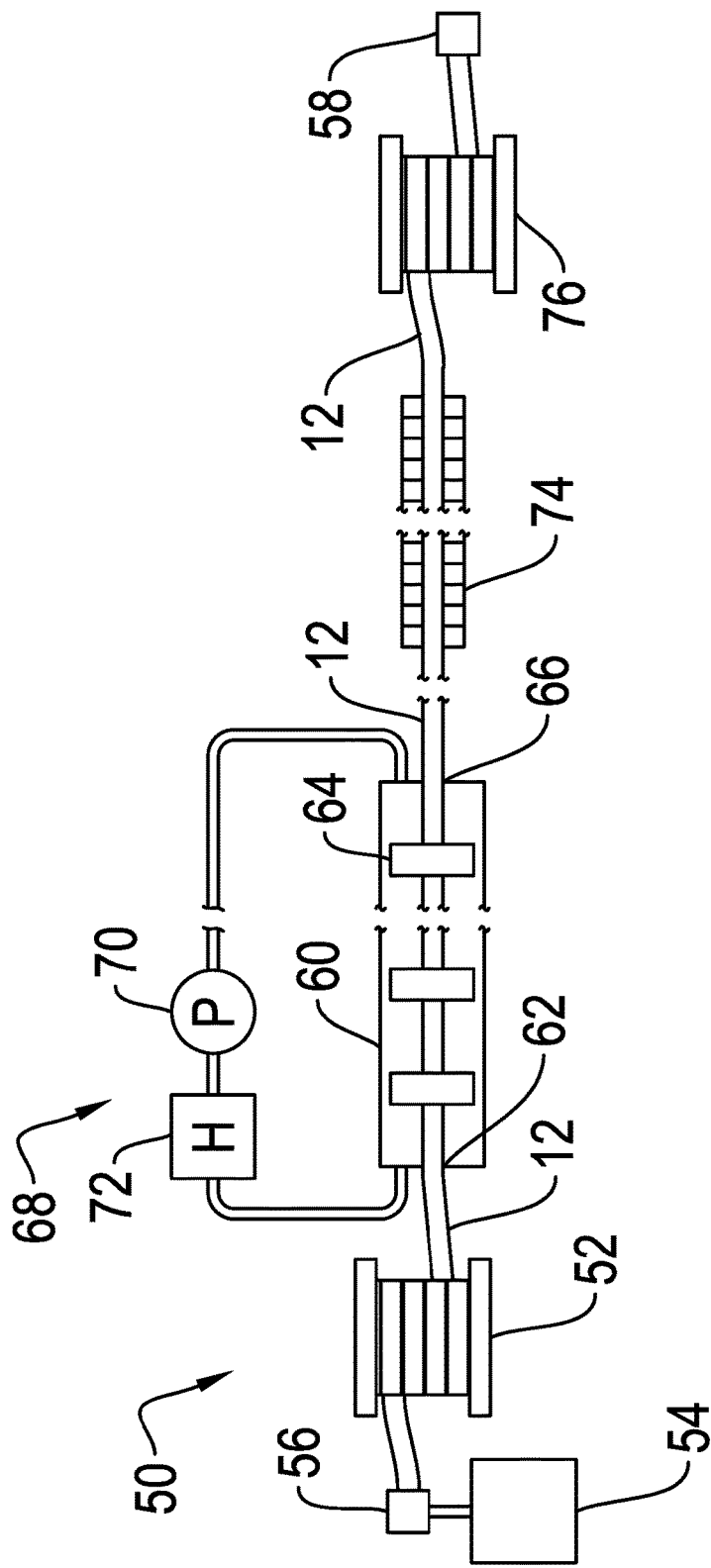
FIG. 4 is a plan view illustrating another possible system configuration.

FIG. 4 illustrates a plan view of an alternate embodiment of the hose repair system 50. Hose repair system 50 allows continuous hose repairs. Hose 12 is stored on an initial storage reel 52. Hose 12 and initial storage reel are configured to allow one end of hose 12 to be in communication with a compressor or other pressurized gas source 54 through a gas fitting 56. The other end of hose 12 can be sealed by a plug 58. Hose 12 can be unreeled from initial storage reel 52 directly into heat treatment trough 60. Trough 60 has an initial transition member 62, a plurality of retaining members 64 and a final transition member 66 for preventing damage to hose 12 as it is deployed into trough 60. These components can be essentially the same as those discussed in FIGS. 1-3.

Trough 60 can also include a liquid heating and circulation system 68 having a pump 70 and a heater 72. Liquid circulation system 68 will heat and circulate the heating liquid through trough 60. This will insure that the liquid in the trough 60 has a uniform temperature. A roller track 74 can be positioned to receive hose 12 as it exits from trough 60. Roller track 74 should be long enough to allow hose 12 to cool before hose 12 is stored on final storage reel 76.

As discussed before, the embodiment of FIG. 4 allows continuous operation. Hose 12 is plugged and pressurized. After an initial section is processed through to final storage reel 76, hose 12 can be gradually unwound from initial storage reel 52, over initial transition member 62 and into trough 60. Unwinding of initial storage reel 52 can be at a travel rate that allows each hose 12 segment to heat sufficiently within trough 60. Hose 12 enters fluid in trough 60 and is held beneath the surface of fluid by retaining members 64. Hose 12 exits trough 60 at final transition member 66. After leaving trough 60, hose 12 travels across roller track 74. Roller track 74 must be long enough to allow hose 12 to cool sufficiently at the travel rate. After hose 12 has cooled it can be stored on final storage reel 76. Hose 12 can be inspected before it is stowed on reel 76. Once all segments of hose 12 have been processed, hose 12 pressure can be equalized to ambient pressure, if desired.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system to repair a hose made from deformable material, comprising:
   an elongated container for holding a liquid;
   a heater system operable for heating the liquid disposed in said elongated container sufficiently for softening said deformable material for use in the container to a predetermined temperature;
   a plurality of restraining members capable of being spaced apart in said elongated container, each of said plurality of restraining members having an engagement surface capable of engaging an exterior of the hose and maintaining at least a portion of the hose immersed in the liquid within said elongated container;

an air supply capable of pressurizing the hose; and
a support capable of holding the hose after positioning the hose in said elongated container.

2. The system of claim 1, further comprising:
an initial hose storage device capable of storing the hose and positioned to provide the hose to said elongated container; and
a final hose storage device capable of storing the hose and positioned to receive the hose from said support.

3. The system of claim 2, wherein said initial hose storage device and said final hose storage device are capable of moving the hose through said elongated container and said support for creating a continuous repair process.

4. The system of claim 1, wherein said heater system comprises:
a conduit joined to a first end of said elongated container and a second end of said elongated container for transmitting liquid from said first end to said second end;
a pump joined to said conduit for moving the liquid; and
a heater joined to said conduit to for heating the liquid.

5. The system of claim 1, wherein said plurality of restraining members are removably insertable into said container.

6. The system of claim 5, further comprising at least one cover joined to said elongated container, said restraining members being joined to said cover wherein said cover is operable to urge said plurality of restraining members downwardly in said liquid for submerging the hose in said liquid.

7. The system of claim 6, further comprising a securing method including at least one of a hinge, a clamp and both, disposed between said cover and said elongated container, whereby said cover is securable in a closed position with respect to said elongated container by said securing method.

8. The system of claim 5, wherein said plurality of restraining members have a weight and density sufficient to immerse the hose in said liquid when the hose is pressurized.

9. The system of claim 8, wherein said restraining member has a slot formed therein capable of guiding the hose upwardly towards said restraining member engagement surface due to buoyant force.

10. The system of claim 1, wherein said restraining member engagement surface comprises at least one semi-circular surface portion having an arc of less than 180 degrees.

* * * * *